US009769476B2

(12) United States Patent
Breiling et al.

(10) Patent No.: US 9,769,476 B2
(45) Date of Patent: Sep. 19, 2017

(54) DIGITAL RECEIVER AND DIGITAL TRANSMITTER HAVING A VARIABLE INTERLEAVER FUNCTIONALITY

(71) Applicant: Fraunhofer-Gesellschaft zur Foerderung der angewandten Forschung e.V., Munich (DE)

(72) Inventors: Marco Breiling, Erlangen (DE); Holger Stadali, Erlangen (DE); Amaia Anorga Gomez, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 884 days.

(21) Appl. No.: 13/967,613

(22) Filed: Aug. 15, 2013

(65) Prior Publication Data

US 2013/0329811 A1   Dec. 12, 2013

Related U.S. Application Data

(63) Continuation of application No. PCT/EP2012/052193, filed on Feb. 9, 2012.
(Continued)

(30) Foreign Application Priority Data

Feb. 18, 2011   (EP) .................................... 11155018

(51) Int. Cl.
*H04N 19/00*   (2014.01)
*H04N 19/85*   (2014.01)
(Continued)

(52) U.S. Cl.
CPC ...... *H04N 19/00903* (2013.01); *H04H 20/72* (2013.01); *H04H 40/18* (2013.01); *H04N 19/85* (2014.11)

(58) Field of Classification Search
CPC .. H04N 19/00903; H04N 19/85; H04H 20/72; H04H 40/18
See application file for complete search history.

(56) References Cited

U.S. PATENT DOCUMENTS

2002/0046329 A1* 4/2002 Song .................... H04H 40/18
711/157
2002/0051438 A1* 5/2002 Yano ...................... G08C 15/00
370/335
(Continued)

FOREIGN PATENT DOCUMENTS

EP   1 017 175 A1   7/2000
EP   1 587 227 A2   10/2005

OTHER PUBLICATIONS

Official Communication issued in International Patent Application No. PCT/EP2012/052193, mailed on Jun. 12, 2012.
(Continued)

*Primary Examiner* — Christopher S Kelley
*Assistant Examiner* — Maria Vazquez Colon
(74) *Attorney, Agent, or Firm* — Keating & Bennett, LLP (57) ABSTRACT

A digital receiver includes a pre-de-interleaver processing block for receiving a receive signal including reception data units quantized using a quantization rule. The digital receiver additionally includes a controllable compressor for compressing the data units into a compressed representation, a controllable time-de-interleaver being configured for applying a varying interleaving size in data units, and a controller for controlling the controllable processor or the controllable time-de-interleaver. The controller is configured for controlling the compressor or the time-de-interleaver so that a higher interleaving size such as a higher interleaving time or a higher number of data units per second is applied, when a compression in a lower number of bits is active.

21 Claims, 8 Drawing Sheets

Related U.S. Application Data (60) Provisional application No. 61/444,248, filed on Feb. 18, 2011.

(51) Int. Cl.
  *H04H 20/72* (2008.01)
  *H04H 40/18* (2008.01)

(56) References Cited

U.S. PATENT DOCUMENTS

| | | | |
|---|---|---|---|
| 2005/0251725 A1* | 11/2005 | Huang | H03M 13/2789 714/752 |
| 2009/0158119 A1* | 6/2009 | Bhattad | H04L 1/0063 714/758 |
| 2010/0095191 A1 | 4/2010 | Mudulodu et al. | |
| 2010/0235706 A1* | 9/2010 | Eberlein | H03M 13/2707 714/752 |

OTHER PUBLICATIONS

"Digital Video Broadcasting (DVB); frame structure channel coding and modulation for a second digital television broadcasting system (BFV-T2)", ETSI EN 302 755 V1.1.1, Sep. 2009, 167 pages.

Stott, "Rotated Constellations", BBC Research, DTG DVB-T2 Implementers' Seminar, Oct. 9, 2008, London, 19 pages.

* cited by examiner

□ 30 bits/word, QPSK: 3 cells/word,
i.e. efficiency increase by factor 3

□ 30 bits/word, 16-QAM: 2 cells/word

| constellation | compressor | ILV-increase | expander |
|---|---|---|---|
| 256 QAM | 12-16 → 10 | - | - |
| non-rotated QPSK | 12-16 → 5 | factor 2 | 5 → 10 |
| rotated QPSK | 12-16 → 6 | factor 1.6 | 6 → 10 |
| non-rotated 16 QAM | 12-16 → (5-8) | factor 1.2-2 | (5-8) → 10 |

⋮ constellation and code rate form a "modcod"

FIG 9

| modcod | rotated constellations | Es/N0[dB] | no.bits for I (or Q) | interval width | no.bits for CSI | total no.bits per cell |
|---|---|---|---|---|---|---|
| QPSK, bel. coderate | off | arbitrary | 5 | 0.25 | 0 | 10 |
| QPSK, coderate 1/2 | on | 5 | 4 | 0.22 | 4 | 12 |
| 16-QAM, coderate 1/2 | off | 0 | 4 | 0.35 | 4 | 12 |
| 16-QAM, coderate 1/2 | off | 9 | 4 | 0.19 | 4 | 12 |
| 16-QAM, coderate 1/3 | on | | 6 | 0.07 | 4 | 16 |
| 64-QAM, bel. coderate | off | arbitrary | 10 | 0.068 | 4 | 24 |
| 64-QAM, bel. coderate | off | arbitrary | 10 | 0.068 | 4 | 24 |
| 256-QAM, bel. coderate | off | 25dB | 10 | 0.035 | 4 | 24 |

FIG 10

DIGITAL RECEIVER AND DIGITAL TRANSMITTER HAVING A VARIABLE INTERLEAVER FUNCTIONALITY

CROSS-REFERENCE TO RELATED APPLICATIONS

This application is a continuation of copending International Application No. PCT/EP2012/052193, filed Feb. 9, 2012, which is incorporated herein by reference in its entirety, and additionally claims priority from U.S. Application No. 61/444,248, filed Feb. 18, 2011, and European Application No. 11155018.2, filed Feb. 18, 2011, both of which are incorporated herein by reference in their entirety.

The present invention relates to digital transmission and particularly to digital transmission as useable in broadcasting operations such as digital video broadcasting (DVB).

BACKGROUND OF THE INVENTION

DVB-T2 as described in the DVB-T2 standard "Digital Video Broadcasting (DVB); frame structure channel coding and modulation for a second generation digital terrestrial television broadcasting system (DVB-T2)", ETSI EN 302 755 V1.1.1 discloses a plurality of so-called "modcods". A modcod is a pair consisting of a modulation/signal constellation such as QPSK, 16-/64-/256-QAM and code rates (1/2, 3/5, 2/3, 3/4, 4/5, 5/6). Each modcod has associated a spectral efficiency. The spectral efficiency is, for example, for a modcod of 16-QAM and a code rate of 2/3 as follows: 4 codebits/symbol*2 infobits/3 codebits=8/3 infobits/symbol=2.67 bits/s/Hz. Additionally, a constellation rotation including a coordinate interleaving can occur subsequent to the mapping of codebits. This procedure is, for example, disclosed in "Jonathan Stott: 'Rotated Constellations' available from http://www.dtg.org.uk/dtg/t2docs/RotCon_Jonathon_Stott_BBC.pdf". The advantage of such a constellation rotation is a higher diversity when transmitting the coded signal which has been mapped to a certain signal constellation. This results in a higher robustness for a given modcod and a spectral efficiency provided by the given modcod.

Typically, a DVB transmission comprises an FEC encoder for applying a certain forward error correction code to an information word. An information word may, for example, consist of 10,000 bits and advantageously consists of, for example, 1,000 bits to 100,000 bits. Depending on the code rate, the FEC encoder generates a codeword from the information word. When there is a code rate of, for example, 1/3, the codeword consists of 30,000 bits when the information word has 10,000 bits. For example, when the codeword has 100,000 bits, then the codeword will have 300,000 bits. The bits of the codeword are introduced into a subsequent bit interleaver. The bit interleaver performs an interleaving within the codeword only, i.e. the for example 300,000 bits within an encoded codeword are interleaved so that an interleaved codeword results, but bits from one codeword are not interleaved with bits of a different codeword. Then, subsequent to the bit interleaver, an interleaved codeword having codebits exists. The codebits are grouped depending on a certain constellation diagram applied in a constellation mapping procedure. When the constellation diagram is, for example, a 256-QAM constellation diagram, then groups of 8 codebits are formed in order to map this group of 8 codebits into a constellation symbol. In 64-QAM, only 6 bits are grouped and mapped to one of the 64 different QAM symbols. Depending on the implementation, a constellation rotation and a cyclic Q-delay can be applied to the individual symbols in order to obtain individual cells. However, the constellation rotation or the cyclic Q-delay can be dispensed with so that the symbols output by the constellation mapping are the same as the so-called cells in the context of the DVB standard. Then, cells are input into a cell and time interleaver to obtain interleaved cells. In the cell and time interleaver the number of cells making up a certain codeword are interleaved with cells from a different codeword, but no interleaving within the cells/modulation symbols themselves occurs. The individual modulation symbols are expressed as complex numbers, where each complex number has an in-phase component or I-component and quadrature component (Q-component). A pair of an I-component and a Q-component which are also called "data units" makes up a constellation symbol or cell. However, with constellation rotation and cyclic Q-delay, a cell is different from a symbol in that a Q-component of a different symbol is paired with a I-component of another symbol while, without the constellation rotation or a cyclic Q-delay, the paired I-component and Q-component of a cell actually make up the constellation symbol in the I/Q plane. Then, subsequent to the cell and time interleaver, the interleaved cells are forwarded to a frame builder.

The FEC encoder performs a channel encoding. The bit interleaver is provided for destroying statistical dependencies which would be there in the receiver between the bits of a symbol, such as the 8 bits of a 256-QAM. These statistical dependencies would have a negative impact on the decoding of the channel codes. For example, when a 256-QAM-symbol would be heavily distorted, then 8 sequential bits would be non-decodable, and such a so-called burst error would result in a more negative impact when compared to a situation where the bit interleaving is applied.

The constellation is obtained, as discussed before, by a mapping of the codebits to a certain desired signal constellation such as 16-QAM.

The constellation rotation and cyclic Q-delay is optional. However, the following example clarifies the technology behind the cyclic Q-delay as described in the conventional-technology reference mentioned before.

[Before any Cyclic Delay]

| | |
|---|---|
| Cell1-0 | I1Q1 |
| Cell2-1 | I2Q2 |
| Cell3-0 | I3Q3 |
| Cell4-0 | I4Q4 |

[After Cyclic Delay of Length=4]

| | |
|---|---|
| Cell1 | I2Q1 |
| Cell2 | I3Q2 |
| Cell3 | I4Q3 |
| Cell4 | I1Q4 |

The cell interleaver makes sure that the I and Q coordinates of a symbol are transmitted at different time instances and on different subcarriers of, for example, an OFDM signal (OFDM=orthogonal frequency division multiplex).

The time interleaver distributes the cells, which belong to an FEC codeword, over a certain time which is also called the interleaver time period. This provides time diversity. Time diversity is advantageous in that only a portion of an FEC codeword is strongly distorted when the transmission channel is not so good at a certain time instance. However, the remaining less distorted portion of the codeword might be sufficient for a successful decoding operation.

The frame builder builds the transmission frames, where a transmission frame defines the actual transmission signal for a predetermined time interval such as 200 ms. Since the T2 standard allows several physical layer pipes (PLPs), i.e. more parallel structures, but with individual modcods, the frame builder builds the frames from different output signals of several existing time interleavers. Such an individual processing chain is also called a "pipe" in the DVB context.

On the receiver side, the chain is processed in the reverse order. One of the blocks in the receiver is the time de-interleaver. The time de-interleaver operates in a cell-wise manner, wherein a cell can comprise, e.g., a received non-rotated QPSK or a rotated 256-QAM. A rotated 256-QAM has 256 possible values for the I-coordinate and additionally for the Q-coordinate. This means that a cell can have values such as a (transmitted in a noisy channel) 256*256-QAM=65 k-QAM. Since a cell can be any one of these constellations, it is useful to finely quantize the I- and Q-coordinates in the receiver before the I- and Q-coordinates are input into the time de-interleaver. In the DVB-T2-implementation guidelines: "Digital Video Broadcasting (DVB); Implementation guidelines for a second generation digital terrestrial television broadcasting system (DVB-T2)", ETSI TR 102 831, it is outlined that one should apply a 10-bit quantization for the I- and Q-components and one should also provide several additional bits for the channel state information, i.e. for the information on an estimated signal-to-noise ratio (SNR) for this cell so that, in the end, one may use 24 to 30 bits per cell, where a cell comprises a pair of data units, i.e. an I portion as a first data unit, a Q portion as the second data unit and the channel state information bits.

It has been settled in DVB-T2 that a receiver may be in the position to de-interleave $2^{19}$ cells. When one applies the above-referenced cell quantization such as 24 to 30 bits per cell, and when the number of cells within the receiver ($2^{19}$) is considered, the whole memory requirement for the time de-interleaver will be between 12 and 15 Mbits.

The number of cells within the time de-interleaver naturally determines the size of the time interleaver within the transmitter. The time interleaver within the transmitter also has to be in the position to process $2^{19}$ cells.

The DVB-T2-standard is finalized and implemented in receivers and is actually used in several countries such as Great Britain and Sweden.

Actually, two further developments of DVB-T2 are under consideration. DVB-T2 mobile should be very close to T2, but should be better suited for a mobile reception within a car or a train. The DVB-Next Generation Handheld (NGH) has the same targets as T2 mobile, but is allowed to have larger deviations from the T2 standard.

One of the most important points in these developments is to try to reduce the price of the receiver chips as much as possible. Today's DVB-T2 receivers are quite expensive and therefore not suitable for being integrated into a mobile phone, since in the mobile phone industry the pressure on the manufacturer for a low price device is particularly high.

It has been found out that a very important contribution to the price of the receiver chip is the memory that may be used for the time de-interleaver, which is typically implemented as an on-chip-RAM.

Therefore, plans exists that T2 mobile and an NGH receiver should have a reduced memory size and should therefore be in the position to only de-interleave a correspondingly reduced number of cells. One example is to reduce the memory by a factor of two, which means only $2^{18}$ cells can be de-interleaved. Correspondingly, the transmitter is also allowed to only interleave such a reduced number of cells.

A reduction of time interleaving, however, means that the cells, which belong to a codeword are spread over a shorter time period. In other words, the time diversity decreases. Therefore, the robustness or power efficiency also decreases in time-variant fading channels.

SUMMARY

According to an embodiment, a digital receiver for receiving a receive signal may have: a receiver for receiving the receive signal, the receive signal having data units quantized using a quantization rule; a controllable compressor for compressing the data units into a compressed representation, wherein a compressed reception data unit has less bits than the same reception data unit before compressing, wherein the compressor is configured for being controlled to operate in at least two different compression modes; a controllable time-de-interleaver for de-interleaving the compressed representation, the time-de-interleaver having associated therewith an interleaving size in data units, wherein the time-de-interleaver is configured for de-interleaving using a variable interleaving size in data units in reply to a de-interleaver control signal; and a controller for controlling the compressor and the time-de-interleaver so that a higher interleaving size is applied, when a compression mode resulting in a lower number of bits of at least two different numbers of bits provided by the controllable compressor is used.

According to another embodiment, a method of receiving a receive signal may have the steps of: receiving the receive signal, the receive signal having data units quantized using a quantization rule; compressing the data units into a compressed representation, wherein a compressed reception data unit has less bits than the same reception data unit before compressing, wherein said compressing is controllable to operate in at least two different compression modes; time de-interleaving the compressed representation, said time-de-interleaving having associated therewith an interleaving size in data units, wherein de-interleaving using a variable interleaving size in reply to a control signal is performed; and controlling said compressing and said time-de-interleaving so that a higher interleaving size of at least two different interleaving sizes is applied, when a compression mode resulting in a lower number of bits of at least two different numbers of bits provided by said compressing is used.

According to another embodiment, a digital transmitter may have: a controllable time interleaver for interleaving a stream of input symbols into a stream of interleaved output symbols, wherein the controllable time interleaver has associated therewith an interleaving size in data units, wherein the time interleaver is configured for interleaving using a variable interleaving size in reply to an interleaver control signal; an output interface for generating an output signal having the stream of interleaved output symbols and an indication of the interleaving size used for generating the stream of interleaved output symbols; and an interleaver controller for determining the interleaving size applied by the controllable time interleaver, wherein the interleaver controller is configured to determine information on a combination of a signal constellation and code rate underlying the interleaver input signal, to determine, whether a rotated constellation is underlying the interleaver input signal or not, to determine a specific parameter instructing the receiver to use one of available the compression modes, or to determine a target or actual SNR value for the receiver, and to control the controllable time interleaver using the determined results.

According to another embodiment, a method of transmitting an information signal may have the steps of: time interleaving a stream of input symbols into a stream of interleaved output symbols, wherein the time interleaving has associated therewith an interleaving size, wherein said time interleaving uses a variable interleaving size in reply to an interleaver control signal; generating an output signal having the stream of interleaved output symbols and an indication of the interleaving size used for generating the stream of interleaved output symbols; and determining the interleaving size applied in said time interleaving, wherein said determining the interleaving size includes determining information on a combination of a signal constellation and code rate underlying the interleaver input signal, determining, whether a rotated constellation is underlying the interleaver input signal or not, determining a specific parameter instructing the receiver to use one of available the compression modes, or determining a target or actual SNR value for the receiver, and applying the determined results in said time interleaving.

Another embodiment may have a computer program having a program code for performing a method for receiving a receive signal in accordance with claim 17, when running on a computer.

Another embodiment may have a computer program having a program code for performing a method for transmitting a transmit signal in accordance with claim 19, when running on a computer.

According to another embodiment, a transmission or reception signal may have a stream of interleaved symbols and an indication of the interleaving size underlying the stream of interleaved symbols.

In embodiments of the present invention, the time interleaver within the digital transmitter is configured to be controllable, such that the interleaver capacity is made controllable. A controllable time-de-interleaver for de-interleaving the compressed representation is used, which has an interleaver size in data units, wherein the time-de-interleaver is configured for de-interleaving using a variable interleaver size in data units in reply to a de-interleaver control signal. A controller for controlling a compressor or the time-de-interleaver is provided so that a higher interleaver size is applied, when a compression mode resulting in a lower number of bits of at least two different numbers of bits provided by the controllable compressor (204) is used.

In an embodiment, the size is used for generating a higher interleaver time period. The interleaver is configured to operate using an interleaving time period, by which two adjacent input symbols are separated from each other by the time-de-interleaver, wherein the controller is configured to control the time de-interleaver, so that a higher interleaver time period is applied, when a compression mode resulting in a lower number of bits of at least two different numbers of bits provided by the controllable compressor is used.

In a further embodiment, the interleaver size is used for accepting a higher data rate. The interleaver is configured to operate using a data rate, by which a stream of input data symbols interleaved to provide a stream of output symbols, wherein the controller is configured to control the time de-interleaver, so that a higher data rate can be applied, when a compression mode resulting in a lower number of bits of at least two different numbers of bits provided by the controllable compressor is used.

Mixtures of both embodiments can be applied as well, i.e., that the interleaver time period is increased partly and the data rate is increased partly as well in case of a reduced number of bits provided by the compressor.

An interleaver controller can control the controllable time interleaver within the digital transmitter as well. Furthermore, an information on the actually or currently used interleaver size is forwarded to an output interface so that a digital receiver is in the position to detect the currently used interleaver time period in order to apply a correct de-interleaving. Particularly, the currently applied interleaver period or interleaver data rate of generally the interleaver size can be controlled based on the applied modcod, i.e. the used signal constellation and code rate or based on the spectral efficiency, or on a selection parameter. The transmitter may signal to the receiver that the receiver should apply a coarser quantization or for other signals a finer quantization. A coarser quantization would result in losses in the AWGN channel, but a longer interleaver period would mean gains in time-variant fading channels. This granularity parameter can additionally or alternatively be used for controlling an interval width, i.e., a quantizer step size in the receiver quantizer. Hence, the receiver quantizer can be controlled in two aspects, i.e., the number of bits corresponding to the number of quantization steps and the step width or step size of all steps or selected steps. Furthermore, when the quantizer in the compressor is configured as a non-linear quantizer, then the granularity or compressor control signal might also signal the quantizer compression functionality or—generally—the non-linear quantization rule determining the step sizes indicated by the individual quantization indices.

Furthermore, depending on whether the rotated constellation option is on or off, a different number of cells is interleaved in the time interleaver. Stated differently, a higher number of points in the constellation diagram may use a finer quantization. The same is true for a rotated constellation which may use a finer quantization than a non-rotated constellation. In such a situation, the number of cells to be interleaved in the time interleaver, or stated differently, the applied interleaver time period is reduced, since the memory situated in the receiver device is limited. On the other hand, when a constellation diagram using a lower number of points is applied, or when, for example, a non-rotated constellation diagram is used, then the quantization does not have to be as fine as in the other case. Then, the number of cells to be interleaved, or stated differently, the interleaver time period can be increased in order to provide a higher robustness for these situations. This means that on the receiver side, even when a smaller constellation diagram is used, the receiver memory, which is actually built into the receiver device, is used to a full extent or at least to as large as possible extent so that a higher interleaver time and therefore a higher robustness is obtained for lower constellation diagrams or lower modcod settings.

On the receiver side, the receive signal comprises data units such as I portions and Q portions of a cell or symbol, which are quantized using a quantization rule. A controllable compressor is configured for compressing the data units into a compressed representation, wherein the compressed reception data unit has less bits than the same reception data unit before compressing. Additionally, a controllable time de-interleaver for de-interleaving the compressed representation is provided and—in certain embodiments—a controllable expander. The controllable compressor, the controllable time de-interleaver and the controllable expander are configured for being controlled by a controller.

The controller is configured for extracting the interleaver control information introduced into the datastream from the digital transmitter or the controller is configured for receiving a certain setting for the different elements e.g. by a transmission from a user input interface or by other input possibilities. For example, when a geographically different modulation is performed, then the receiver could have a location device or a navigation device in order to determine its position and to set the actual compressor/de-interleaver or expander setting based on the determined geographical position.

In other embodiments, a different number of cells is provided within the time interleaver/de-interleaver in the receiver based on the currently used modcod (used signal constellation and code rate) or the spectral efficiency. Alternatively or additionally, the devices are controlled whether the rotated constellation option is on or off, or additionally or alternatively, the controller can be configured for using the actually estimated SNR for controlling the time de-interleaver. Moreover, the controller's configuration can be determined by a granularity parameter received from the transmitter, from the user or from some other device inside the receiver. Depending on implementations where additionally the channel state information is transmitted within a cell, the channel state information can be compressed similar to the data units, i.e. the I portion and Q portion of a cell or symbol.

In certain embodiments, it is of utmost importance that the changes on the overall system by implementing the invention or by implementing embodiments of the invention are as small as possible. In such a situation, it is advantageous to not only make the compressor and the time de-interleaver controllable, but to also provide an expander which is controllable as well so that the expander is configured to be an "interface" for the rest of the circuit, i.e. for the post de-interleaver processing so that the de-interleaving processing does not notice any changes due to the compressed format of the data units. Stated differently, this expander makes sure that the impact of implementing embodiments of the invention in the straightforward existing receiver device keeps the number of changes as low as possible.

BRIEF DESCRIPTION OF THE DRAWINGS

Embodiments of the present invention will be detailed subsequently referring to the appended drawings, in which.

DETAILED DESCRIPTION OF THE INVENTION

Before advantageous implementations are discussed in the context of detailed block diagrams, several relevant issues are discussed. Specifically in digital video broadcasting one has a very wide range of spectral efficiencies that can range from 0.4 bits/s/Hz (QPSK, code rate 1/5) up to 6.7 bits/s/Hz (256-QAM, rate 5/6). According to simulation results for an AWGN, the corresponding Es/N0 values that may be used range from −4 dB up to 22 dB.

Despite this very large dynamic range, the cell quantization in DVB is static. A cell quantization of 10 bits per I and per Q and some bits for the channel state information is recommended. For a given memory size in bits, this results in a fixed number of cells available for the time (de-)interleaver. The time interleaver may use up to a constant number of approximately $2^{19}$ cells in DVB-T2, and in NGH and T2 mobile, the current proposal is to use $2^{18}$ cells.

The above cell quantization was specified to cope with the "worst" case of 256-QAM and very high spectral efficiencies. The quantization was fine enough such that the quantization noise Q0 does not affect the SNR Es/(N0+Q0) significantly. Q0 (quantization noise) may be much smaller than the normal noise N0, which means that a very small Q0 may be used for a high SNR. Stated differently, a certain quantization noise is generated when performing a quantization. Hence, the quantization can—optionally together with the core rate of the FEC encoder—be selected in such a way that a quantization rule such as a quantization step size is applied or—in case of the compressor—is underlying the compressed representation, which results in a quantization noise being markedly lower than the thermal noise of the transmission channel.

When a signal has thermal noise before quantization, then the quantization noise is added to the thermal noise subsequent to quantization. Hence, in order to make sure that Q0 is much smaller than N0, such as smaller by 16 dB, very fine quantization has to be applied. On the other hand, for example, for a QPSK with a code rate of 1/5, the Es/N0 that may be used is equal to −4 dB. In this situation, the quantization noise could be quite large without degrading performance. Therefore, embodiments of the present invention use an adaptive cell quantization that is advantageously chosen according to the current spectral efficiency and advantageously or alternatively also dependent on the current signal constellation, i.e. the current modcod. Other implementations are to use an adaptive cell quantization depending on whether rotated constellations are on or off, where rotated constellations may use a finer quantization. Other implementations are to use an adaptive cell quantization based on the currently estimated SNR. Other implementations are to use an adaptive cell quantization based on a selected granularity parameter.

Particularly, the present invention can be applied in two directions. One direction is that the actual memory size of the time interleaver or time de-interleaver is maintained. In this case, it is possible to use more cells for interleaving or de-interleaving, i.e. to increase the interleaver/de-interleaver time period for situations with lower spectral efficiencies. The other direction is to reduce the interleaver memory size. Then, for higher spectral efficiencies, a lower number of cells can be interleaved which results in a lower interleaver time period, but for lower spectral efficiencies a higher robustness can nevertheless be maintained due to the fact that for lower spectral efficiencies a coarse quantization is selected, and therefore the interleaver time period can be increased compared to the situation where a fine quantization is applied.

The impact on the waveform of the present invention are that the number of available cells in the demodulator's time de-interleaver is not constant anymore. More cells are interleaved for low spectral efficiencies, i.e. for a coarser quantization, and a higher number of cells is used for high spectral efficiencies where a finer quantization may be used. Hence, with respect to the current standard, the number of the cells in the modulator's time interleaver can be larger than currently for low spectral efficiencies and can be maintained the same as currently for high spectral efficiencies.

Figure 1:
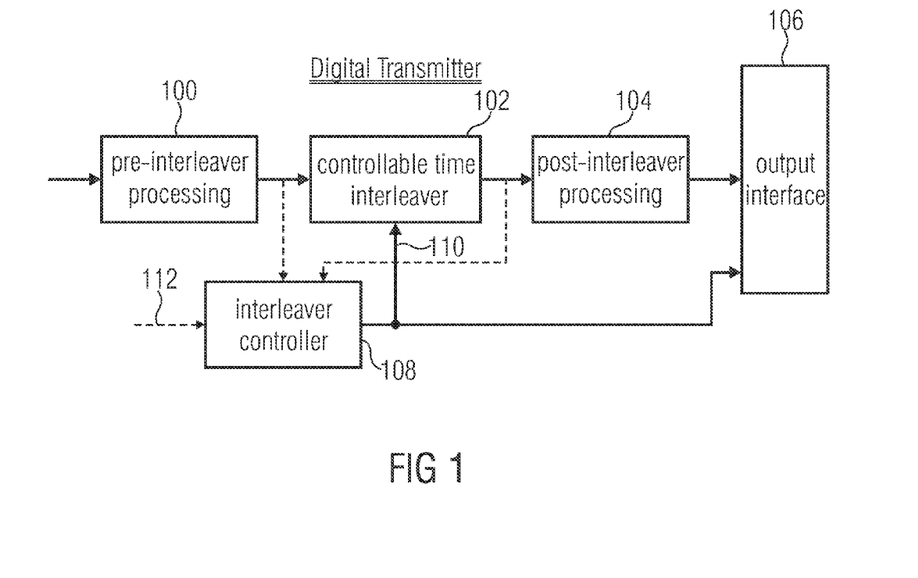
FIG. 1 is an embodiment of a digital transmitter.
Figure 9:
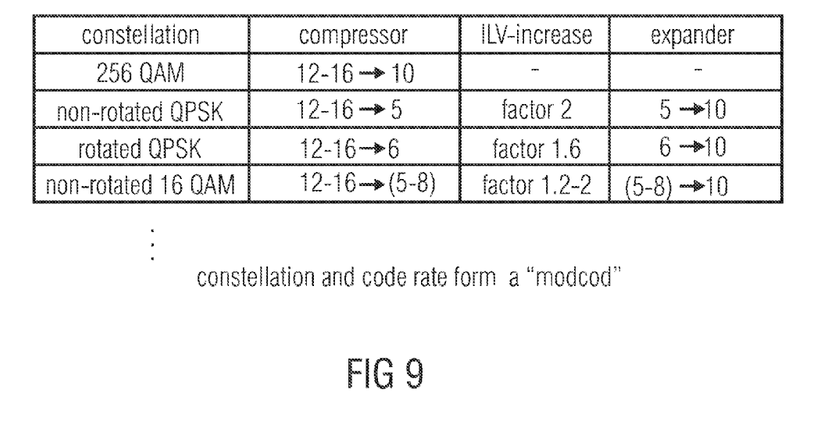
FIG. 9 illustrates a table associating different constellations to different compressor/interleaver/expander settings.

FIG. 1 illustrates a digital transmitter. The digital transmitter may comprise a pre-interleaver processing portion generally indicated at 100, a subsequently connected controllable time interleaver 102 and a post-interleaver processing 104 as indicated as a general block in FIG. 1. Furthermore, an output interface 106 is provided together with an interleaver controller 108. The controllable timer interleaver 102 is for interleaving a stream of input symbols into a stream of interleaved output symbols. Advantageously, an input symbol is a I portion, a Q portion, or alternatively a pair of I and Q portions depending on the situation with or without constellation rotation and cyclic Q-delay. In an advantageous case however, an input symbol represents a plurality of bits rather than a single bit. The interleaver has associated therewith an interleaver time period indicating a time period, by which two adjacent input signals are separated in the stream of interleaved output symbols. In accordance with the present invention, the interleaver is configured for interleaving using a variable interleaver time period in reply to an interleaver control signal as indicated at 110. The interleaver control signal 110 is provided by the interleaver controller 108 depending on certain situations which can, for example, be the currently used modcod, i.e. the currently used pair of signal constellation and code rates, the currently used spectral efficiency or whether a rotated constellation option is on or off. FIG. 9 illustrates certain constellation diagrams and the impact on the interleaver. For example, when a non-rotated QPSK is used, the interleaver time period may be increased by a factor of two by the control signal 110. Other factors for a different constellation such as a rotated QPSK or a non-rotated 16-QAM are illustrated in FIG. 9 as well.

The output interface 106 in FIG. 1 is configured for generating an output signal comprising the stream of interleaved output symbols and an indication of the permutation pattern used for generating the stream of interleaved output symbols. This feature is useful for a receiver so that the receiver is, by itself, in the position to find the correct de-interleaver setting.

As illustrated, the interleaver controller 108 can detect the best time interleaver setting from the signal output by the pre-interleaver processing block 100 or input into the post-interleaver processing 104, or alternatively the interleaver controller can also receive a user input or a signalization parameter from the signal source such as illustrated at 112.

Figure 3:
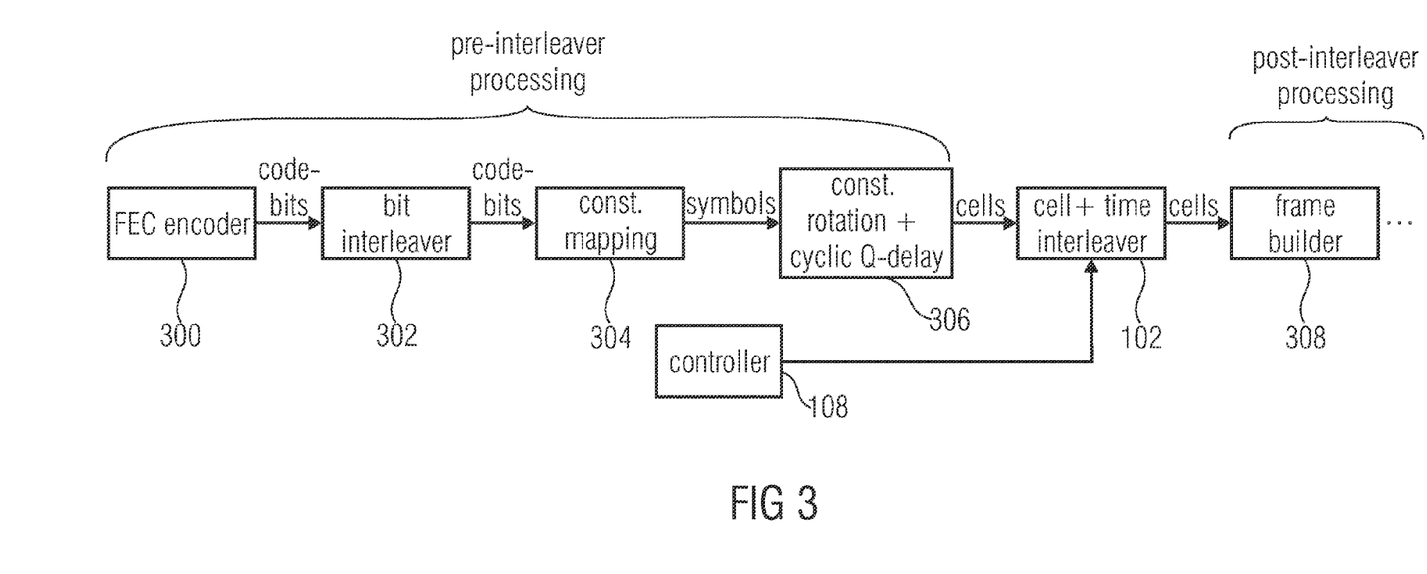
FIG. 3 is an advantageous implementation of a digital transmitter.

FIG. 3 illustrates certain specific implementations for the pre-interleaver processing. The pre-interleaving processing may comprise an FEC encoder 300, a bit-interleaver 302, a constellation mapping block 304, an optional constellation rotation or a cyclic Q-delay block 306, and these blocks can be implemented as discussed before. Additionally, the controllable time interleaver 102 and the interleaver controller 108 are provided and the interleaved cells or interleaved "symbols" depending on the existence of block 306 are input into a frame builder 308, which is one of the examples for post-interleaver processing in block 104 in FIG. 1. Further procedures will be applied in subsequent steps not illustrated in FIG. 3 in order to finally obtain the analog high frequency transmission wave. All procedures in FIG. 3, however, are performed in the digital domain and the digital-to-analog conversion into the analog transmission signal from the digital side is not illustrated in FIG. 3.

Figure 2:
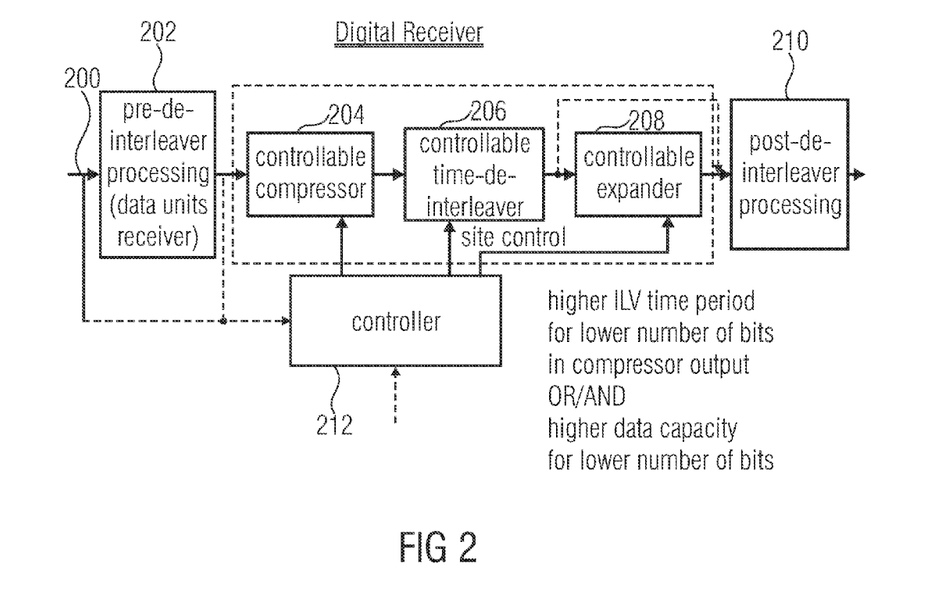
FIG. 2 is an embodiment of a digital receiver.

FIG. 2 illustrates a digital receiver for receiving a receive signal input at input 200. The signal is input into a pre-de-interleaver processing block 202 which may comprise a data receiver for receiving the receive signal, the receive signal comprising data units quantized using a certain quantization rule, since the procedures illustrated in FIG. 2 are all in the digital domain. The data units can be I portions or Q portions or complete cells/symbols consisting of a I portion and a Q portion, and depending on the implementation several channel state bits. However, in an advantageous case, the data units comprise a plurality of bits rather than single bits. The output of the pre-de-interleaver processing 202 is input into a controllable compressor 204, which is connected to a controllable time de-interleaver 206. The controllable time de-interleaver may or may not be connected to a controllable expander 208, which is connected to a post-de-interleaver processing illustrated as block 210. Furthermore, a controller 212 is provided for controlling, depending on the embodiments, the controllable compressor 204, the controllable time de-interleaver 206 and the controllable expander 208.

Particularly, the controllable compressor 204 is configured for compressing the data units into a compressed representation. In the compressed representation, a reception data unit has less bits than the same reception data unit before compressing, and the compressor is configured for being controlled into at least two compression modes. Typically, the pre-de-interleaver processing 202 will, at any point in the processing chain, comprise an analog/digital converter, which performs a certain very fine quantization, and this very fine quantization, which is for example 16 bits or so, is reduced by the controllable processor to useful values such as 10, or depending on the compression mode, to values even lower such as 5 or so, in order to make sure that the memory that may be used by the controllable time de-interleaver 206 is at acceptable levels.

Hence, the analog/digital converter 202 determines the quantization rule which is inherent with the digital reception data units entering the controllable compressor 204. The controllable compressor has at least two different compression states. In a first compression state, the compressor can reduce the bits for a symbol by a first amount with respect to the quantization rule, and in a second compression state, the compressor can reduce the bits for a symbol by a second amount higher or lower than the first amount. In a further embodiment, however, one compression mode can be the "trivial" mode, in which the compressor does not perform a further compression but simply forwards the data units quantized in accordance with the first quantization rule. This mode is used, when the quantization rule is already coarse enough in view of the current situation or in view of an available control or side information parameter.

Furthermore, the controllable time de-interleaver 206 is for de-interleaving the compressed representation, where the time de-interleaver has associated therewith an interleaver size. The variable interleaver size can be used to provide a variable interleaver time period, by which two adjacent input signals are separated form each other by the time de-interleaver or to implement a variable interleaver data rate or a mixture of both parameters.

The interleaver time period can be the maximum time period measurable at the transmitter or receiver, by which two adjacent symbols in the input are separated in the output or—in case of variable interleaver patterns—can be an averaged time e.g. averaged over 100 or 500 or so times, by which the symbols of pairs of adjacent input symbols are separated from each other in the output stream.

In an embodiment, the time de-interleaver is configured for de-interleaving using a variable permutation pattern in reply to a de-interleaver control signal. The interleaver can be implemented in hardware or in software or in a mixture of both, although a hardware implementation for an integrated receiver chip is advantageous.

The controller for controlling the compressor 204 or the time de-interleaver 206 or both elements 204 and 206 is configured for controlling in such a way that a higher interleaver size (in units of cells) is applied, when a compression mode applied by the controllable compressor results in a lower number of bits.

Stated differently, the controllable compressor has a first compression mode where a compressed reception data unit has a first number of bits and a second compression mode where the compressed reception data unit has a second number of bits, where the second number of bits is smaller than the first number of bits. Furthermore, the controllable time de-interleaver has a first interleaver mode having a first interleaver size and a second interleaving mode having a second interleaver size, where the second interleaver size is larger than the first interleaver size. Then, the controller is configured for concurrently controlling the controllable compressor in the second compression mode and the time de-interleaver 206 in the second interleaver mode as well, so that a small number of bits of a compressed symbol receives a high interleaver duration, or that a higher data rate can be de-interleaved. On the other hand, a higher number of bits of a compressed symbol should experience a smaller interleaver duration, or a lower data rate can be de-interleaved.

The configuration for the controller can be provided from the data stream by a configuration extractor not shown in the figures or the signal can be directly parsed by the controller. Alternatively, or additionally, the user can input the mode via a user input interface such as a keyboard, a mouse a touch screen or so.

Figure 4A:
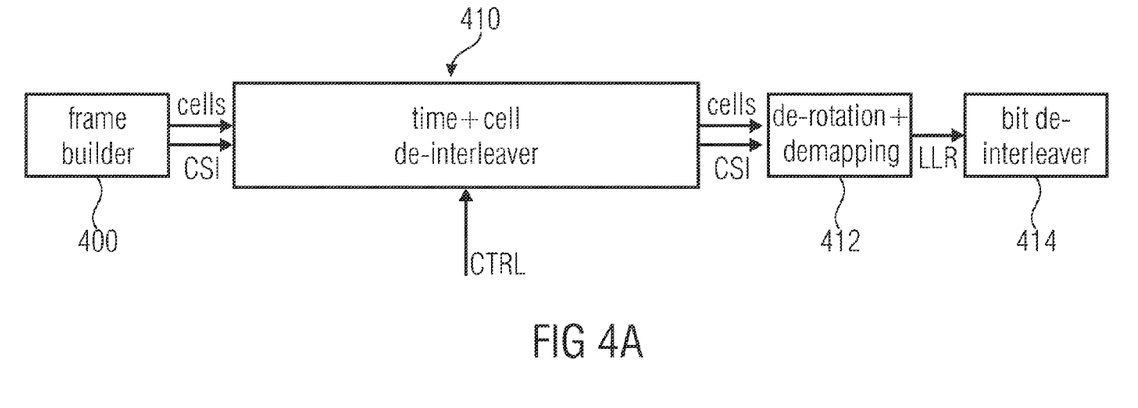
FIG. 4a and FIG. 4b are illustrations of an advantageous receiver embodiment.
Figure 4B:
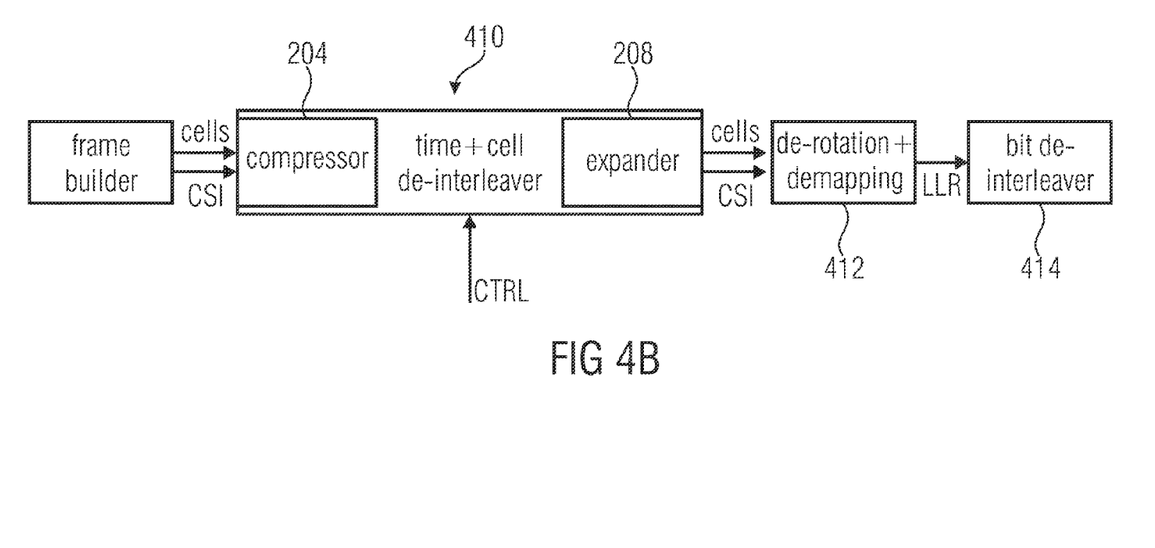

FIG. 4a and FIG. 4b illustrate a further implementation of the inventive digital receiver. As an example for a pre-de-interleaver processing 202, a frame builder 400 is illustrated, which provides cells and CSI information to the controllable time de-interleaver apparatus 400, which comprises the controllable compressor 204 and the controllable expander 208 as illustrated in FIG. 4b. Furthermore, examples for a post de-interleaver processing 210, such as a de-rotation and demapping, and the subsequently connected bit de-interleaver indicated at 412 and 414 are illustrated as well. Element 412 processes the cells and the associated CSI information in parallel, i.e. advantageously using the same processing for cells and CSI, since the cells and the channel state information are associated with each other, and block 411 only receives soft bits or LLRs (LLR=Log Likelihood Ratio) generated by the preceding block 412.

FIG. 4b illustrates that the time and cell de-interleaver apparatus 410 now comprises a compander consisting of the compressor 204 and the expander 208. Hence, the surrounding modules, i.e. blocks 202 and 210 will not experience any change so that the implementation of the present invention will have a minimum effect on existing implementations.

Subsequently, an example for controlling the controllable compressor is illustrated in the context of a non-rotated QPSK diagram, and this corresponds to the second line of the table in FIG. 9 or the first line in the table of FIG. 10. The compressor operation is to calculate the I- and Q-bit LLR and quantize them. For code rates from 1/5 up to 5/6, it has been found that a 5-bit LLR quantization shows virtually no losses even for time-/frequency-variant channels. Hence, 5+5 bits instead of 20+x bits are stored, since a CSI information needs not to be stored in this embodiment. The 5+5 bits stand for 5 bits for the I-component and 5 bits for the Q-component. Hence, the interleaving time is more than twice as long as in the case where the present invention is not applied.

The operation of the expander, which is not necessary at this implementation, would be to simply forward the I- and Q-LLRs and use as the CSI output of the time de-interleaver $\sqrt{E_S/N_0}=1/4$. The straightforward existing QPSK demapper in the block 210 would then calculate $LLR_{I/Q}=4\sqrt{E_S/N_0}*Cell_{I/Q}$, and therefore outputs the LLRs already contained in $cell_{I/Q}$.

Figure 5:
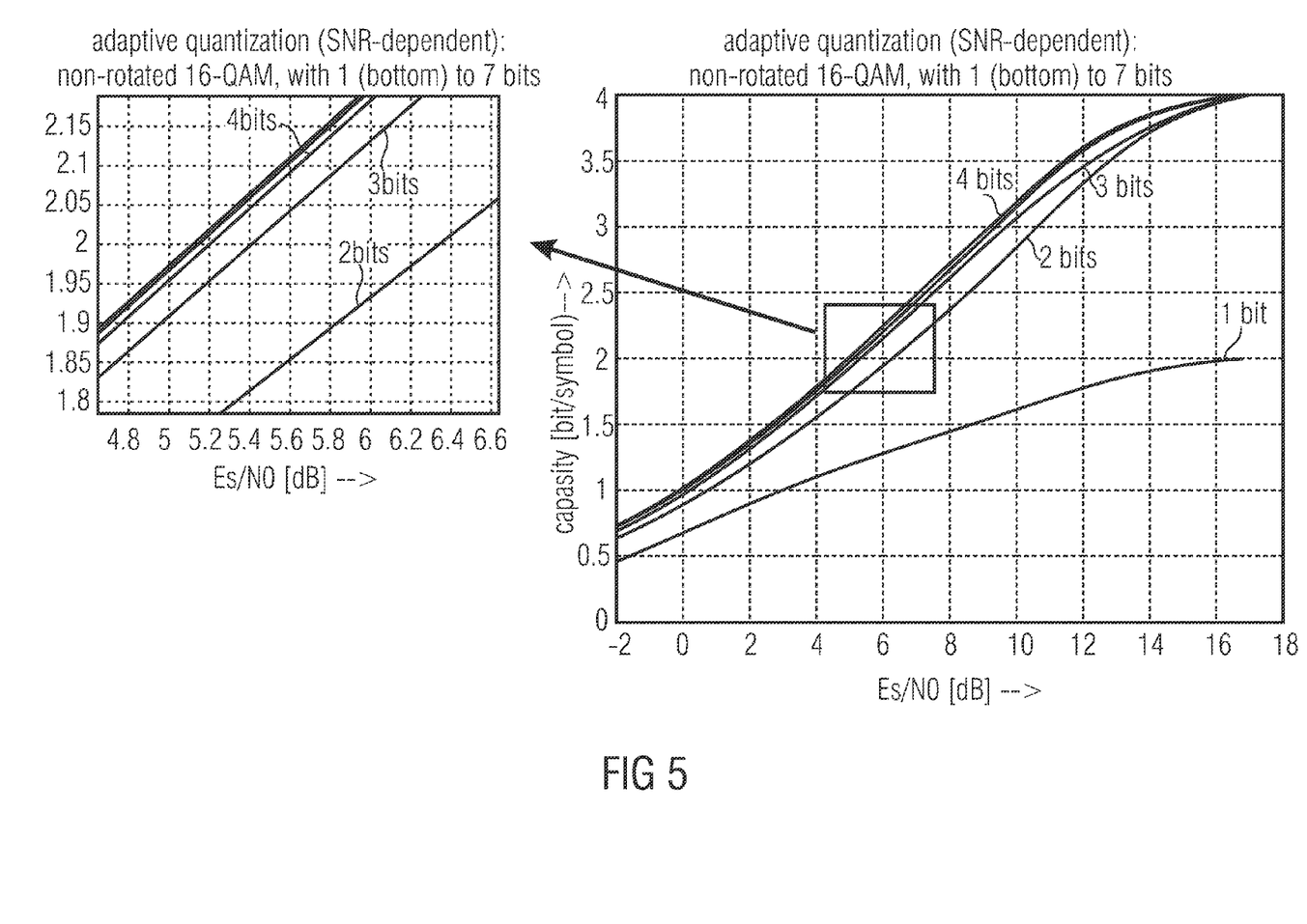
FIG. 5 illustrates the impact on quantization with respect to the channel capacity.
Figure 10:
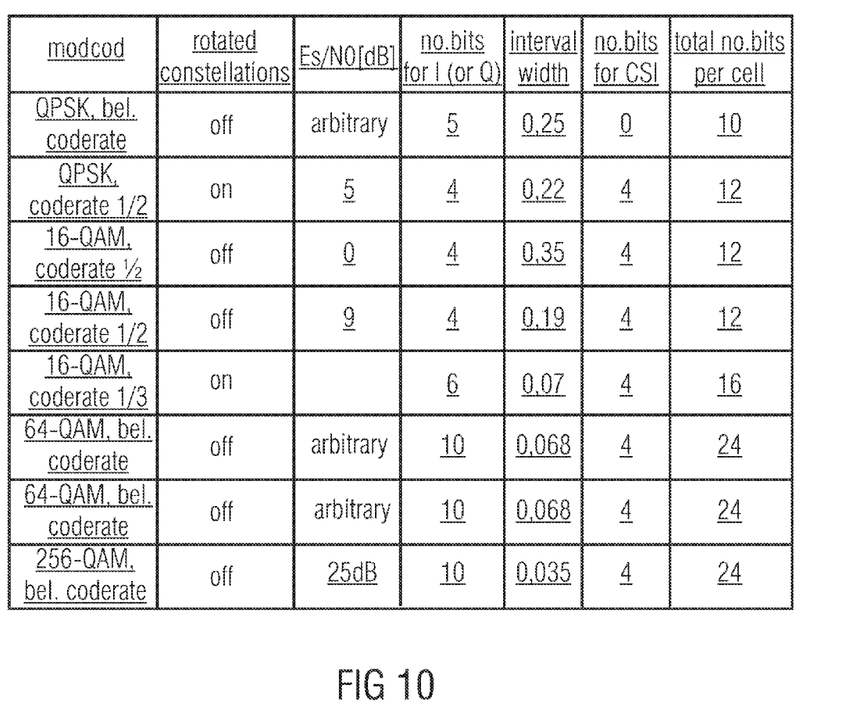
FIG. 10 illustrates a table of modcod pairs.

A further embodiment relates to a non-rotated 16-QAM corresponding to the last line in the table in FIG. 9 or the third, the fourth, the fifth line of the table in FIG. 10. The situation in this context is illustrated in FIG. 5, which clearly demonstrates that the improvements in channel capacity for an increasing number of quantization bits per I or Q signal does not increase significantly over a quantization of 4 bits. However, depending on the situation, quantizations of 3 bits or 2 bits could be applied, but a quantization of 4 bits is advantageous.

FIG. 5 illustrates that, e.g. for a channel capacity of two bits per symbol, the SNRs ($Es/N_0$) that may be used depends on the employed quantization: for a fine quantization, lower SNRs are needed than for a coarse quantization. For a quantization of 2 bits an SNR of about 6.3 may be used. For a quantization with three bits, a lower SNR is sufficient. It is visible that a finer quantization does not reduce the SNR anymore by a significant amount, so that a quantization of 4 bits is perfectly sufficient, and this is also illustrated in FIG. 10. When, however, an SNR value associated with a reception data unit pair (I,Q) indicates an SNR below the value specified in FIG. 5 for a code rate of 1/2, for example, then the interval width of the quantizer/compressor for quantizing this cell is to be narrowed. When the SNR increases again, then the interval width can be increased again. Hence, the interval width can be adaptively controlled by the SNR value. Furthermore, certain interval widths may be used for each of the different modcods and the different SNR values as is indicated in FIG. 10 for some specified SNR values, and these interval widths can be increased or decreased, when the associated SNR is higher or lower than the specified value.

FIG. 10 illustrates other modcod pairs in the context of whether there are rotated constellations or not and the associated data values, where the quantization ranges between 10 bits and even 4 bits, where a number of bits for the channel state information is constant apart from QPSK with non-rotated constellations, where the CSI bits are not required. The number of channel state bits (CSI bits), however, can vary as well. Hence, a certain total number of bits per cell is illustrated in the right column and it is clear that for all the modes in the first to sixth lines of the Table, improvements regarding an increased interleaver time period are gained. The interval width only is valid for the following normalization of the reception signal. The received useful signal energy per cell Es=2, i.e., the energy of the I component and the Q component is one for each component. An example for CSI at QPSK with rotated constellations is given. CSI=0 means erasure, and the SNR is minus infinity. 0<CSI<16 means Es/N0 [dB]=−10.5+1.5× CSI, for example Es/$N_0$=0 dB for CSI=7.

For the non-rotated 16-QAM corresponding to the third and fourth line of FIG. 10, quantization is SNR-dependent, and channel state information such as 4 bits needs to be stored together with the reception data units I, Q together forming a cell. Therefore, the adaptive quantization is optimized for the time-variant/frequency-selective channels, when the symbols/cells have associated a variable SNR, where, for each instantaneous SNR, the optimum quantization is used. This results in a loss for such channels smaller than 0.1 dB.

The cells for non-rotated 16-QAM need only 4 bits for quantized I/Q plus 4 bits CSI. Therefore, 12 bits for a cell may only be used instead of 20 bits plus "some bits" for channel state information as currently used.

Figure 6:
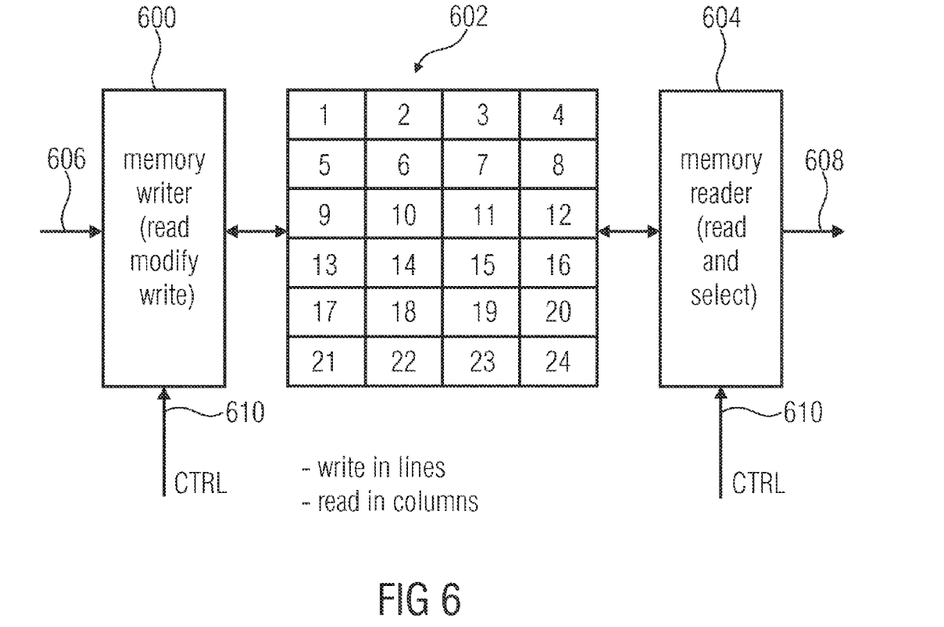
FIG. 6 illustrates an implementation of a de-interleaver core.
Figure 7:
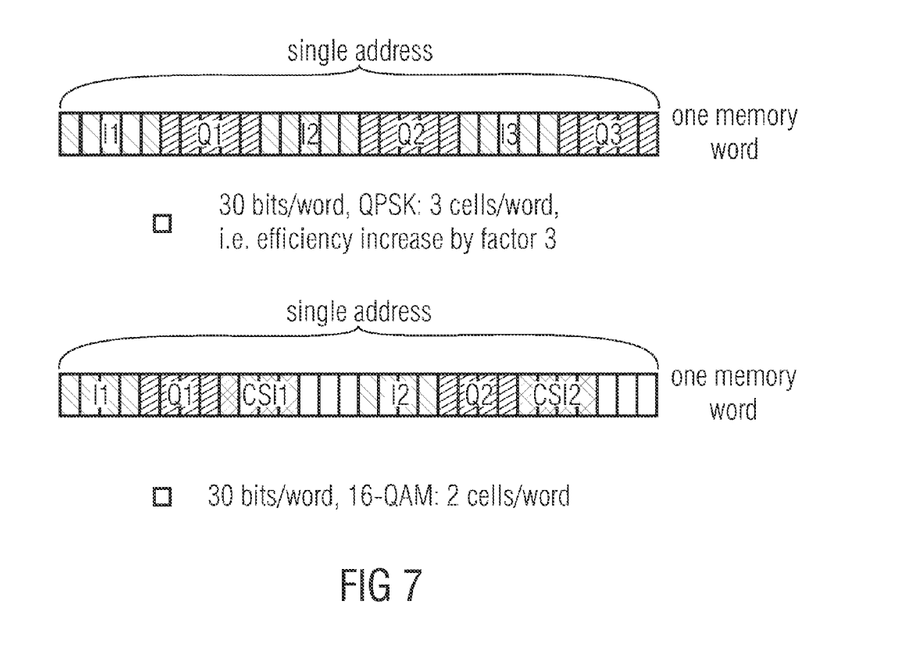
FIG. 7 illustrates certain memory management options depending on the controllable interleaver/de-interleaver setting.
Figure 8:
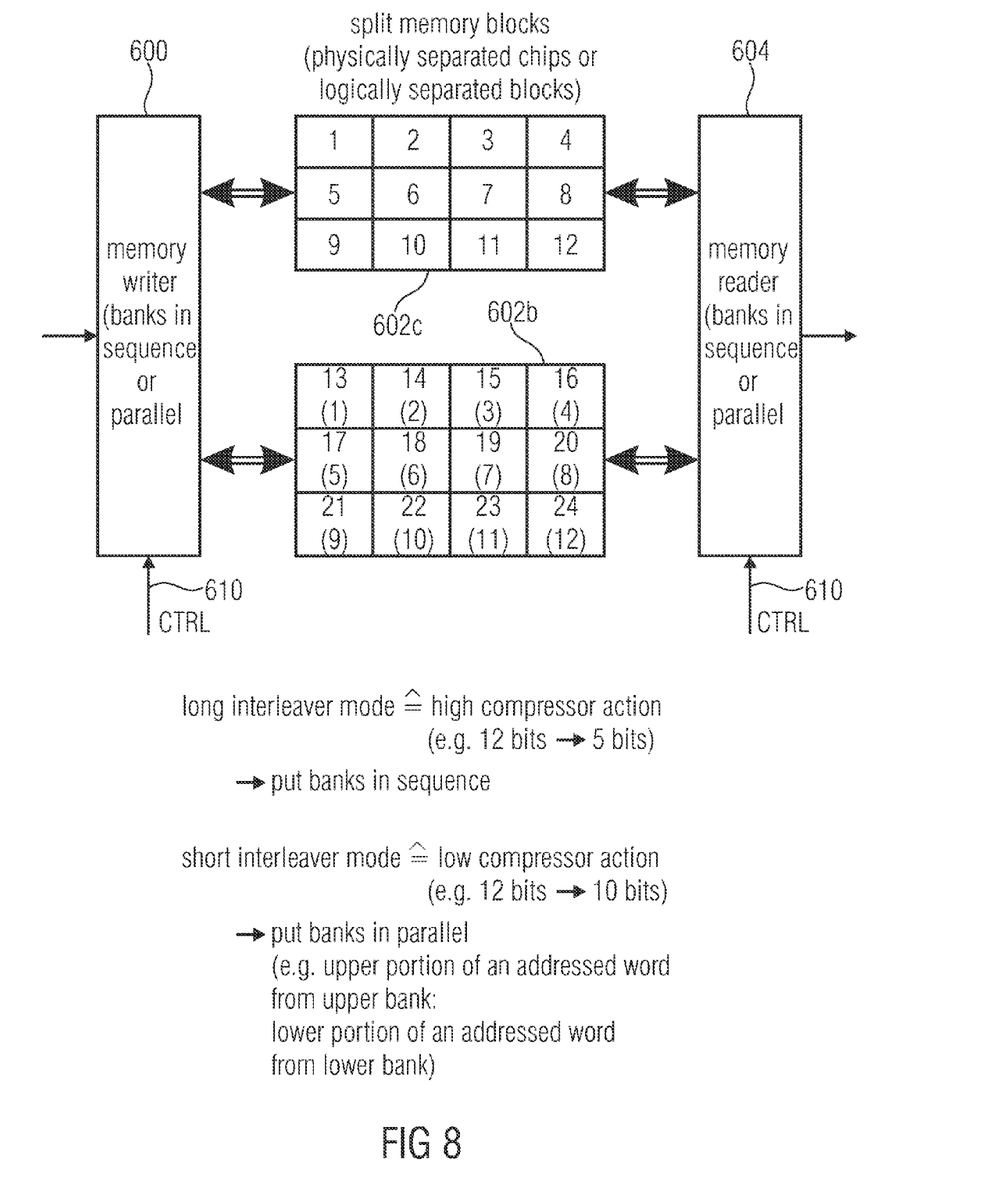
FIG. 8 illustrates a further implementation of the interleaver/de-interleaver core.

Subsequently, FIGS. 6-8 are discussed in order to illustrate a more detailed implementation of a time and cell de-interleaver or time and cell interleaver core. In an embodiment illustrated in FIG. 6, the time and cell interleaver or time and cell de-interleaver comprises a memory writer 600, an RAM memory portion 602 and a memory reader 604. The input of the memory writer illustrated at 606 is connected to the output of the compressor 204 of FIG. 2, and the output of the memory reader illustrated at 608 is connected to the input of the controllable expander 208 of FIG. 2. Particularly, elements 600 and 604 are controllable via control signals 610 which advantageously come from the controller 212 in FIG. 2 and reflect the control of the controller 212 over the controllable time-de-interleaver 206 (or analogously the control of the controllable time interleaver 102 in FIG. 1).

A typical interleaver operation is that the memory writer writes subsequent data units or subsequent pairs of data units into the memory 602 in the order indicated by the addresses extending from 1 to 24 in this example, although it is understood that the interleaver memory actually used is much larger. The memory reader 604 is configured to read out the memory in columns, while the memory writer 600 has written the data input into the memory in lines. Hence, the output signals would be 1, 5, 9, 13, 17, 21, 2, 6, 10, . . . . This means that an interleaver time period corresponding to the length of 5 symbols has been applied, and it becomes clear that the interleaver length is proportional to the number of data units placed between two adjacent data units on the interleaver input side. While, on the interleaver input side, the data units written into memory places indicated by the addresses 1 and 2 were adjacent, these two data units are now separated by five data units on the output side, which were written into addresses 5, 9, 13, 17, 21.

In a situation, in which the memory word length is constant and independent of the spectral efficiencies as can be the case in current receiver ASICs, one cell including channel state information is associated with each memory word. Therefore, the memory space under address 1, for example, in FIG. 6 now becomes much larger than the quantized bits that may be used for a cell due to the controllable compressor 204 operation. For the inventive adaptive quantization, it is advantageous to pick N≥1 cell into each memory word. Therefore, as illustrated in FIG. 7, one could introduce, in a memory having 30 bits per word, three cells per word if each cell may use only 10 bits due to the quantization in the controllable compressor. Further, alternatively, as shown in the lower line of FIG. 7, two cells per word could be introduced into a 30-bits memory word length in case of 16-QAM, where each cell may use 12 bits due to the additional channel state information. For other memory situations, one could proceed as follows. When a memory word length is fixedly set to 24 bits per word, 2 cells per word with 4 memory bits unused could be fed into a single address word for QPSK, or, for 16-QAM, 2 cells per word could be introduced into a 24-bits per word memory.

Due to the fact that, in a straightforward implementation, a single memory access reads or writes all individual bits associated with a memory address, a read modify write scheme has to be applied instead. For each cell write, the word is to be read from the memory, the read value is modified with the new cell and is written back. For each cell read applied by the memory reader 604, the word from the memory is to be read and the particular cell, such as, for example, in the upper example of FIG. 7, the first, the second or the third cell is to be selected. The total memory throughput (read and write) grows by a factor of 1.5. For a throughput of most 10 Mcells/s in the framework of DVB, this corresponds to maximum 30 mega memory accesses per second which does not constitute a problem.

Hence, in this implementation, each address in FIG. 6 comprises, for example, 6 quantized reception data units corresponding to three cells and the interleaver operation is performed in such a way that the compressed data units are written sequentially into a memory in lines with the read modify write operation and the readout is performed in such a way that, in the first run, the memory reader reads address 1 and selects I1 and Q1, then selects address 5 and selects the first two data units in address 5 and proceeds until address 21 and selects the first two data units in address 21. Then, the memory reader proceeds to again access to the address number 1, but now selects the third and fourth data units in this address and, then, the memory reader again proceeds to memory address 5, again selects the third and fourth data units in this cell. Then, the memory reader again accesses address 9 and selects the third and fourth data units in this cell, etc. until cell 21. Then, the memory reader again accesses cell 1, but now selects the fifth and the sixth data units, etc. until cell 21. After having selected the fifth and sixth data units from cell 21, the memory reader proceeds to address 2. It becomes clear that, now, the interleaver time period between the first element in address 1 and the first element in address 2 has been increased by a factor of 3, and, therefore, the interleaver time period has been increased by a factor of about 3 as well, compared to a de-interleaver with a fixed quantization independent of the modcod, constellation rotation state, specific granularity parameter, and SNR.

Alternatively, the same interleaver time period as for the fixed quantization case such as 1 s can be applied and the data rate of the interleaver or de-interleaver can be increased by three. Hence the interleaver or de-interleaver can process three times the amount of cells within a second in order to provide interleaved symbols for a higher number of e.g. OFDM subcarriers carrying these cells compared to the case of a finer quantization.

In the case of a fine quantization, the interleaver or de-interleaver has a data capacity of data rate to provide data for e.g. 10 OFDM subcarriers that carry the currently interleaved or de-interleaved data stream. Now, the quantization is made coarser by a factor of 2, and the interleaver or de-interleaver can now process double the amount of data, i.e., provide data for e.g. 20 OFDM subcarriers for the considered data stream. Then, the interleaver time period has not changed, but the number of subcarriers has changed. This allows to dynamically adapt the transmitted data amount per data stream, when e.g. the transmitted signal is switched over from a normal video to a HD video program requiring higher data rate. In a mixed mode, the number of carriers can be increased to 15 and the remaining capacity is used to increase the interleaver period.

An alternative implementation of the memory access in the context of so-called split memory blocks is illustrated in FIG. 8. Exemplarily, the memory 602 can be physically separated into different chips or logically separated into blocks on the same physical chip and there will exist, for example, two banks 602a, 602b of 512 kilowords of width 12 bits each instead of a single bank of 256 kilowords of 24 bits. Then, in the long interleaver mode, which means that there is a high compressor action achieving coarse quantization, where, for example, the compressor compresses the data units from 12 bits to 5 bits, the banks are put in sequence. When an address space of $2^{19}$ words of width 12 is available, a long interleaver duration results and the split memory blocks 602a and 602b are processed/addressed and read or written in a similar way as discussed in context with FIG. 6. When, however, a short interleaver mode due to a low compressor action achieving fine quantization is applied such as when the compressor only compresses from 12 bits to 10 bits, the banks are put in parallel and the addresses in brackets "( . . . )" in block 602b become pertinent. Then, there is an address space of $2^{18}$ words (actually 12 words in the example in FIG. 8) of double width such as, for example, a width of 24 bits. The compressor action mentioned in FIG. 8 results in an individual data unit and the address space is related to a cell or symbol consisting of two data units of, for example, 10 bits and, depending on the implementation, additional four channel state bits or not. Additionally, as in FIG. 6, the different memory write and memory read operations are controlled by control signals on lines 610 provided to the memory writer and the memory reader.

Other implementations which do not require a specific memory control, but which may use only a certain compressor control are that the time interleaving pattern is changed slightly so that, for example pairs or, depending on the implementation of FIG. 7, triples of cells or larger vectors of cells or interleaving units (IU) are interleaved together. Hence, for example, pairs of QPSK or 16-QAM cells could be interleaved together and, then, a read and write operation performed by elements 600 and 604 would be applied to the complete memory words containing two cells each. This requires neither a read-modify write nor a splitting of the memory into banks. However, compared to the other implementations, this procedure does not separate adjacent cells from each other and, therefore, has an, in a sense, decreased interleaver operation for adjacent cells.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive transmitted signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A digital receiver for receiving a receive signal, comprising:
   a receiver that receives the receive signal, the receive signal comprising data units quantized using a quantization rule;
   a controllable compressor that compresses the data units into a compressed representation, wherein a compressed reception data unit comprises less bits than the same reception data unit before compressing, wherein the compressor is configured for being controlled to operate in at least two different compression modes;
   a controllable time-de-interleaver that de-interleaves the compressed representation, the time-de-interleaver having associated therewith an interleaving size in data units, wherein the time-de-interleaver is configured for de-interleaving using a variable interleaving size in data units in reply to a de-interleaver control signal; and a controller that controls the compressor and the time-de-interleaver so that a higher interleaving size is applied, when a compression mode resulting in a lower number of bits of at least two different numbers of bits provided by the controllable compressor is used.

2. The digital receiver in accordance with claim 1, in which the time-de-interleaver is configured to operate using an interleaving time period, by which two adjacent input symbols are separated from each other by the time-de-interleaver, wherein the controller is configured to control the time de-interleaver, so that a higher interleaver time period is applied, when a compression mode resulting in a lower number of bits of at least two different numbers of bits provided by the controllable compressor is used.

3. The digital receiver in accordance with claim 1, in which the time-de-interleaver is configured to operate using a data rate, by which a stream of input data symbols interleaved to provide a stream of output symbols, wherein the controller is configured to control the time-de-interleaver, so that a higher data rate is applied, when a compression mode resulting in a lower number of bits of at least two different numbers of bits provided by the controllable compressor is used.

4. The digital receiver in accordance with claim 1, further comprising a controllable expander for mapping a de-interleaved compressed representation generated by the controllable time-de-interleaver into an expanded representation, in which an expanded reception data unit comprises more bits than a reception data unit before expanding.

5. The digital receiver in accordance with claim 4, in which the controller is configured to additionally control the expander to expand in such a way that the bits that may be used for an expanded reception unit is equal to the bits that may be used for the reception data units before compressing by the controllable compressor.

6. The digital receiver in accordance with claim 1, in which the receive signal comprises an indication on an interleaver time underlying the receive signal, and in which the receiver is configured to extract the indication from the receive signal and to provide the indication to the controller.

7. The digital receiver in accordance with claim 1, in which the controller is configured to determine an information on a combination of a signal constellation and code rate underlying the receive signal, to determine, whether a rotated constellation is underlying the receive signal or not, to determine a specific parameter instructing the receiver to use one of available the compression modes, or to determine a current signal to noise ratio value from a channel information associated with the reception data units, and to control the controllable compressor or the controllable time-de-interleaver using the determined results.

8. The digital receiver in accordance with claim 1, in which the reception data units comprise associated channel information, and in which the controllable compressor or the controllable time-de-interleaver are configured to compress the channel information or to de-interleave the compressed channel information, respectively.

9. The digital receiver in accordance with claim 1, in which a reception data unit comprises a real part of or an imaginary part of a complex reception symbol, and in which the time-de-interleaver is configured for de-interleaving pairs of reception data units, and wherein the time-de-interleaver is configured to not change an order of bits within a pair of reception data units or the order of the pair of reception data units.

10. The digital receiver in accordance with claim 1, in which the time-de-interleaver comprises:
a memory;
a memory writer that writes into the memory, the memory writer being connected to the controllable compressor; and
a memory reader that reads from the memory in a way different from a way applied by the memory writer, the memory reader being connected to a post-de-interleaver processor or a controllable expander,
wherein the memory writer or the memory reader is configured to operate in different modes depending on the de-interleaver control signal.

11. The digital receiver in accordance with claim 1, in which the controllable compressor is configured for applying a 10-bit compression in a first compression mode and a 5-bit compression in a second compression mode, wherein the first compression mode is associated with 256-QAM constellation rule, and the second compression mode is associated with a QPSK constellation rule.

12. The digital receiver in accordance with claim 1, in which the controller is configured to determine a current SNR from channel information associated with the reception data unit, and to determine a varying quantization depending on the current SNR, and
wherein the controllable compressor is configured to compress the reception data units as determined by the controller.

13. The digital receiver in accordance with claim 10, in which the memory comprises a number of addresses and each address is associated with a certain number of bits,
wherein the memory writer is configured to write more than one reception data unit under a single address to achieve a longer interleaver time period and to write, in a different interleaver mode, one reception data unit or less than one reception data unit under a single address to achieve a shorter interleaver time period.

14. The digital receiver in accordance with claim 10, in which the memory writer is configured to perform a read-modify-write operation to write one pair of reception units under a single address of the memory that comprises more than one pair of reception units.

15. The digital receiver in accordance with claim 10, in which the memory comprises two or more individually addressable memory blocks,
wherein the memory writer is configured for addressing the memory blocks in sequence to achieve a high interleaver time period or to achieve a higher data rate, or to address the memory blocks in parallel so that each reception unit is composed of a portion of bits read from the first block and a portion of bits read from the second block to achieve a smaller interleaver time period.

16. The digital receiver in accordance with claim 10, in which the memory writer is configured for writing at least two pairs of reception units into a single address, and
in which the memory reader is configured to read the at least two pairs of the reception units from a single address.

17. A method of receiving a receive signal, comprising:
receiving the receive signal, the receive signal comprising data units quantized using a quantization rule;
compressing the data units into a compressed representation, wherein a compressed reception data unit comprises less bits than the same reception data unit before compressing, wherein said compressing is controllable to operate in at least two different compression modes;

time de-interleaving the compressed representation, said time-de-interleaving having associated therewith an interleaving size in data units, wherein de-interleaving using a variable interleaving size in reply to a control signal is performed; and controlling said compressing and said time-de-interleaving so that a higher interleaving size of at least two different interleaving sizes is applied, when a compression mode resulting in a lower number of bits of at least two different numbers of bits provided by said compressing is used.

18. A digital transmitter, comprising:

a controllable time interleaver that interleaves a stream of input symbols into a stream of interleaved output symbols, wherein the controllable time interleaver has associated therewith an interleaving size in data units, wherein the time interleaver is configured for interleaving using a variable interleaving size in reply to an interleaver control signal;

an output interface that generates an output signal comprising the stream of interleaved output symbols and an indication of the interleaving size used for generating the stream of interleaved output symbols; and an interleaver controller that determines the interleaving size applied by the controllable time interleaver, wherein the interleaver controller:

determines a specific parameter instructing a receiver to use a compression mode of a plurality of available compression modes, and sets the interleaving size dependent on the specific parameter.

19. A method of transmitting an information signal, comprising:

time interleaving a stream of input symbols into a stream of interleaved output symbols, wherein the time interleaving has associated therewith an interleaving size, wherein said time interleaving uses a variable interleaving size in reply to an interleaver control signal;

generating an output signal comprising the stream of interleaved output symbols and an indication of the interleaving size used for generating the stream of interleaved output symbols; and determining the interleaving size applied in said time interleaving, wherein said determining the interleaving size comprises:

determining a specific parameter instructing a receiver to use a compression mode of a plurality of available compression modes, and setting the interleaving size dependent on the specific parameter.

20. A non-transitory computer readable medium including a computer program comprising a program code for performing a method for receiving a receive signal in accordance with claim 17, when running on a computer.

21. A non-transitory computer readable medium including a computer program comprising a program code for performing a method for transmitting a transmit signal in accordance with claim 19, when running on a computer.

* * * * *